(12) United States Patent
Chai et al.

(10) Patent No.: US 11,893,332 B2
(45) Date of Patent: Feb. 6, 2024

(54) GLOBAL MISTRACKING ANALYSIS IN INTEGRATED CIRCUIT DESIGN

(71) Applicant: Synopsys, Inc., Mountain View, CA (US)

(72) Inventors: Wenwen Chai, Sunnyvale, CA (US); Li Ding, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/395,277

(22) Filed: Aug. 5, 2021

(65) Prior Publication Data

US 2022/0050947 A1 Feb. 17, 2022

Related U.S. Application Data (60) Provisional application No. 63/065,780, filed on Aug. 14, 2020.

(51) Int. Cl.
*G06F 30/3315* (2020.01)
*G06F 119/12* (2020.01)

(52) U.S. Cl.
CPC ...... *G06F 30/3315* (2020.01); *G06F 2119/12* (2020.01)

(58) Field of Classification Search
CPC ............ G06F 30/3315; G06F 30/3947; G06F 30/398; G06F 2119/12
See application file for complete search history.

(56) References Cited

U.S. PATENT DOCUMENTS

| 7,458,049 | B1* | 11/2008 | Tuncer | ............... G06F 30/3312 703/2 |
| 8,806,412 | B1* | 8/2014 | Wang | ............... G06F 30/327 716/108 |
| 10,162,916 | B1* | 12/2018 | Narasimha | ............... G06F 30/34 |
| 2006/0090150 | A1* | 4/2006 | Kucukcakar | ........ G06F 30/3312 716/113 |
| 2014/0123095 | A1* | 5/2014 | Buck | ............... G06F 30/392 716/135 |

OTHER PUBLICATIONS

K. Gulati and S. P. Khatri, "Accelerating statistical static timing analysis using graphics processing units," 2009 Asia and South Pacific Design Automation Conference, Yokohama, Japan, 2009, pp. 260-265, doi: 10.1109/ASPDAC.2009.4796490. (Year: 2009).*

* cited by examiner

*Primary Examiner* — Jack Chiang
*Assistant Examiner* — Aric Lin
(74) *Attorney, Agent, or Firm* — Park, Vaughan, Fleming & Dowler LLP; Laxman Sahasrabuddhe (57) ABSTRACT

For each circuit element in a pair of launch and capture paths, a parameter value of the circuit element may be modified by a variation amount that is assigned to a class of circuit elements to which the circuit element belongs. Next, a timing slack may be computed for the pair of launch and capture paths.

20 Claims, 7 Drawing Sheets

GLOBAL MISTRACKING ANALYSIS IN INTEGRATED CIRCUIT DESIGN

RELATED APPLICATION

This application claims the benefit of U.S. Provisional Application Ser. No. 63/065,780, filed on 14 Aug. 2020, the contents of which are herein incorporated by reference in their entirety for all purposes.

TECHNICAL FIELD

The present disclosure relates to integrated circuit (IC) design. More specifically, this disclosure relates to global mistracking analysis in an IC design.

BACKGROUND

Advances in process technology and an increasing demand for computing and storage have fueled an increase in the size and complexity of IC designs. Static timing analysis (STA) is an important step in an IC design flow, in which timing constraints of an IC design may be checked to ensure that the IC design is expected to operate as desired when the IC design is manufactured.

SUMMARY

Embodiments described herein may feature techniques and systems for performing global mistracking analysis in an IC design. For each circuit element in a pair of launch and capture paths, a parameter value of the circuit element may be modified by a variation amount that is assigned to a class of circuit elements to which the circuit element belongs. Next, a timing slack may be computed for the pair of launch and capture paths.

In some embodiments described herein, each class of circuit elements has a corresponding variation model which is used to assign the variation amount to the class of circuit elements. In some embodiments described herein, the variation model is a corner-based model. In some embodiments described herein, the variation model is a statistical model.

In some embodiments described herein, each class of circuit elements corresponds to a set of masks, where each circuit element in a given class of circuit elements is manufactured using a set of masks corresponding to the given class of circuit elements.

In some embodiments described herein, at least one class of circuit elements includes transistors that have the same threshold voltage. In some embodiments described herein, at least one class of circuit elements includes transistors that have the same doping type. In some embodiments described herein, at least one class of circuit elements includes transistors that have the same channel length. In some embodiments described herein, at least one class of circuit elements includes interconnects on the same metal layer.

In some embodiments described herein, assignments may be generated based on variation models, where each assignment includes a parameter variation amount for each class of circuit element. Next, correlations may be determined between the variation models based on the assignments. A timing-slack-sensitivity model may be constructed, which calculates an impact of an assignment on a timing slack. Next, the timing-slack-sensitivity model may be used to compute a set of timing slacks corresponding to a set of correlated assignments, which is generated based on the correlations between the variation models.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

An IC chip may be manufactured by using a semiconductor manufacturing process. Each step in the semiconductor manufacturing process may use complex physical and/or chemical processes. The term "process variation" may refer to one or more random and/or systematic variations that occur during semiconductor manufacturing, and which cause variations in the characteristics and/or the behavior of circuit elements in the manufactured IC chip. The term "mistracking" may refer to different circuit elements being affected differently by a given process variation. For example, a given process variation may cause one type of transistor to switch faster but cause another type of transistor to switch slower. The term "process corner" or "corner" may refer to a value of an electrical property of a circuit element that corresponds to a process variation. For example, a given process corner may correspond to a particular transistor threshold voltage value.

With the continuous shrinking of technology nodes, IC designs are becoming more and more sensitive to variations such as threshold voltage variations, doping density variations, and geometry variations. The term "technology node" may refer to the smallest feature dimension that can be reliably manufactured by a semiconductor manufacturing process. For example, the term "5 nm node" may refer to a semiconductor manufacturing process that can reliably manufacture 5 nm features. The term "advanced technology node" may refer to the smallest technology nodes that are currently being used.

Process variations can generally be categorized as global variations and local variations. The term "global" may refer to the entire IC design and the term "local" may refer to a neighborhood around a circuit element. Specifically, global variations may impact circuit elements that belong to the same class of circuit elements across the entire IC design. Circuit elements belonging to different classes may be affected differently by global variations. This may cause global mistracking, which can cause severe timing problems and cause chip failures if not modeled accurately.

Embodiments described herein are generally applicable to global variations in any circuit element. One example of global variation is threshold voltage (Vt) mistracking which may be caused by variations in the transistor threshold voltages. Another example of global variation is interconnect mistracking which may be caused by variations in width, resistivity, thickness, and/or spacing between metal wires in the metal layers.

Different sets of masks may be used for manufacturing transistors belonging to different Vt classes, which may cause transistor threshold voltage variations to be strongly correlated within one Vt class, but less correlated across different Vt classes. Likewise, different sets of masks may be used for manufacturing different metal layers, which may cause resistivity and/or capacitance variations to be strongly correlated within one metal layer, but less correlated across different metal layers.

Performing IC design timing signoff analysis by assuming that all transistors and/or interconnects have variations based on the same corner leads to inaccuracies. A user may utilize a margin-based method to achieve timing safety. For example, Vt mistracking impact may be margined using timing derates, e.g., by applying minimum timing derate in a capture path and a maximum timing derate in a launch path. The term "derate" may refer to an error margin that is added to a parameter value for safety.

Such minimum-on-capture-path and maximum-on-launch-path timing derate based approaches can achieve signoff safety. However, such approaches are overly pessimistic which results in overdesign in terms of performance, power, and area (PPA). An approach is "pessimistic" if a PPA-related value (e.g., timing slack of a path, area of an IC design, leakage power of an IC design) reported by the approach is worse than the range of PPA-related values that are likely to occur in an actual manufactured IC chip. If derating is not performed pessimistically during signoff in these approaches, then it can lead to an unsafe signoff.

Mistracking may also impose other limitations on the IC design. For example, the IC design may be forced to use only one Vt class in the clock network to make the circuit behavior more consistent. This constraint may become even more limiting at advanced technology nodes where many Vt classes are used.

Therefore, there is a need for a solution which can accurately model global mistracking in circuit elements and decrease timing pessimism. Specifically, there is a need to reduce timing pessimism during STA so that IC designs can achieve safe timing signoff and operate at higher clock speeds.

Embodiments described herein can accurately and efficiently model the impact of global variations on circuit elements and accurately and efficiently predict the impact of global variations on timing slack. Some embodiments disclosed herein globally model process variation impact on circuit elements and perform efficient global mistracking analysis on the IC design to ensure signoff safety, with significantly reduced pessimism. Specifically, some embodiments described herein feature techniques and systems for global mistracking analysis of transistors and interconnects. Some embodiments described herein feature an accurate and efficient MC-based analysis engine.

Features and advantages of embodiments disclosed herein include, but are not limited to: (1) extending one corner-based STA to region-based analysis to improve signoff safety, (2) significantly reducing pessimism, thereby making the circuit design more competitive, (3) applying the same global variation to the same class of circuit elements in both launch and capture paths, (4) explicitly modeling the correlation among different classes of circuit elements, and (5) general applicability to various types of global mistracking problems. The launch path and the capture path are timing paths that are used for calculating delay. The launch path and the capture path begin at the same point on the clock tree. The launch path corresponds to a signal being "launched" from the first register. The launch path passes through the clock pin of the first register, the output of the first register, and ends at the input of the second register. The capture path corresponds to the signal being "captured" at the second register. The capture path passes through the clock tree and ends at the clock pin of the second register.

Figure 1:
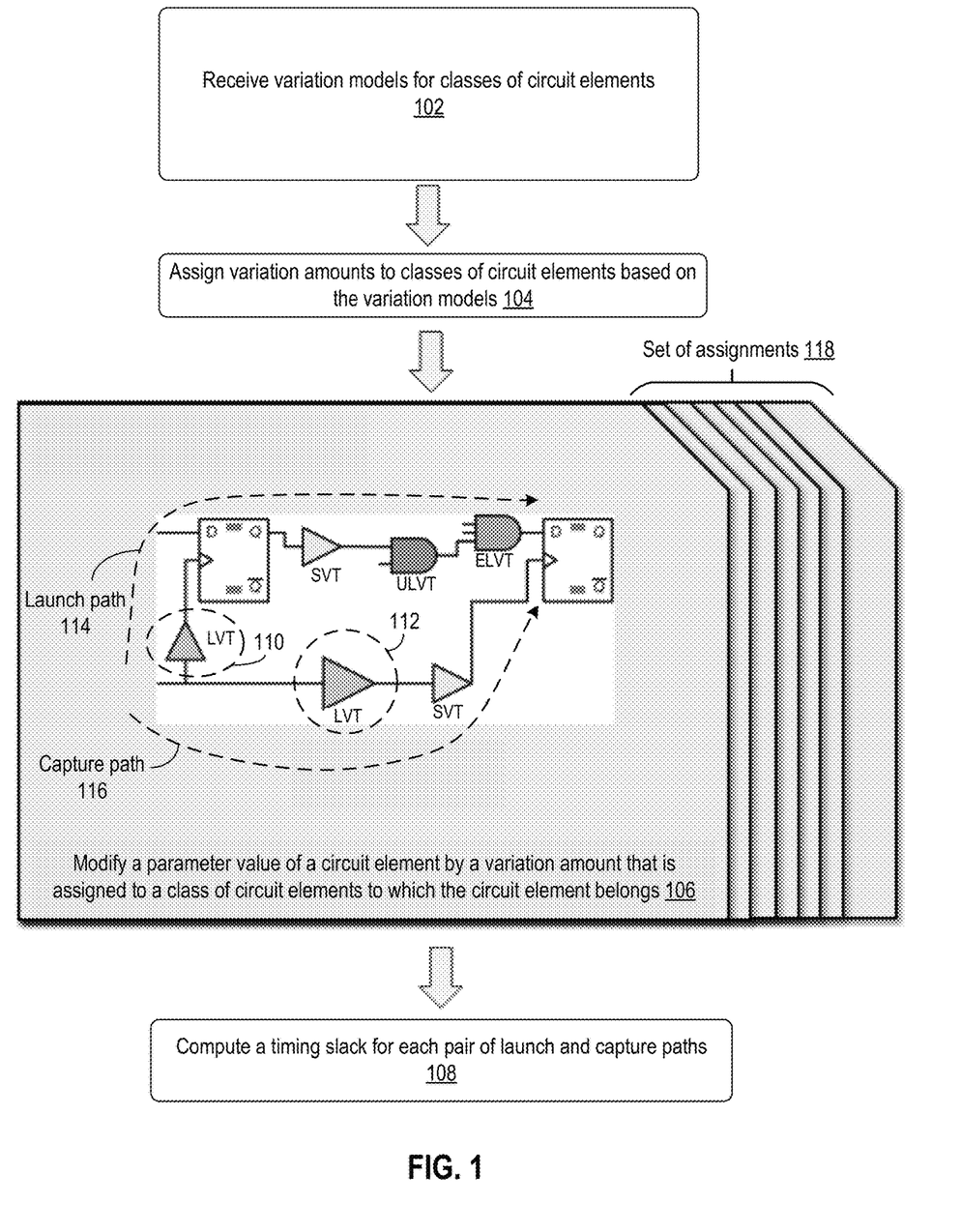
FIG. 1 illustrates a process for calculating timing slack by modeling global mistracking in accordance with some embodiments described herein.

FIG. 1 illustrates a process for calculating timing slack by modeling global mistracking in accordance with some embodiments described herein.

Variation models for classes of circuit elements may be received (at 102). Next, variation amounts to classes of circuit elements may be assigned based on the variation models (at 104). Examples of variation amounts include, but are not limited to, (1) a variation in the threshold voltage of a transistor, (2) a variation in the switching delay of a transistor, (3) a variation in a parasitic resistance of a metal interconnect, and (4) a variation in the parasitic capacitance of a metal interconnect. Specifically, a set of assignments 118 may be generated, where in each assignment, the classes of circuit elements are assigned variation amounts based on the variation models.

For a given assignment, a parameter value of a circuit element may be modified by a variation amount that is assigned to a class of circuit elements to which the circuit element belongs (at 106). Examples of parameters include, but are not limited to, (1) a threshold voltage of a transistor, (2) a switching delay of a transistor, (3) a parasitic resistance of a metal interconnect, and (4) a parasitic capacitance of a metal interconnect. A parameter value may increase or decrease by the variation amount. For example, if the parameter value is 1.0, and the variation amount is −0.1, then the modified parameter value is 0.9.

For example, launch path 114 may include circuit element 110 and capture path 116 may include circuit element 112. Circuit elements 110 and 112 may belong to the same class of circuit elements, e.g., the class of circuit elements that uses low voltage threshold transistors (shown as "LVT" in FIG. 1). For a given assignment in the set of assignments 118, the voltage threshold of transistors in circuit elements 110 and 112 are modified by the same variation amount. Other circuit elements in launch path 114 and capture path 116 may belong to other classes of circuit elements, which are shown in FIG. 1 as standard voltage threshold (SVT), ultra-low voltage threshold (ULVT), and extremely low voltage threshold (ELVT). The variation amounts assigned to circuit elements belonging to the SVT, ULVT, and ELVT classes may be different from the variation amount assigned to circuit elements 110 and 112, which belong to the LVT class. Next, for a given assignment, a timing slack may be computed for each pair of launch and capture paths (at 108). The assignments that result in the worst set of timing slacks may then be identified. A change in a parameter value of a circuit element may affect the delay of the circuit element. For example, a decrease in the threshold voltage may cause the transistor to switch faster (i.e., have lower delay). Thus, once the parameter values of the circuit elements have been modified at 106, the delays of timing paths may be calculated by aggregating individual circuit element delay values that correspond to the modified parameter values. Next, the new timing path delays may be used to calculate the timing slack.

In some embodiments described herein, each class of circuit elements may correspond to a set of masks that is used to manufacture the class of circuit elements. For example, a first set of masks may be used to manufacture low voltage threshold transistors and a second set of masks may be used to manufacture ultra-low voltage threshold transistors. Accordingly, the low voltage threshold transistors may belong to a first class of circuit elements and the ultra-low voltage threshold transistors may belong to a second class of circuit elements. Further, a third set of masks may be used to manufacture interconnects on a first metal layer and a fourth set of masks may be used to manufacture interconnects on a second metal layer. Accordingly, the interconnects on the first metal layer may belong to a third class of circuit elements and the interconnects on the second metal layer may belong to a fourth class of circuit elements.

Each class of circuit elements corresponds to a distinct set of masks. Two sets of masks are distinct if they differ by at least one mask. Thus, the set of masks {M-1, M-2, M-3} and the set of masks {M-1, M-2, M-4} are distinct set of masks. The correspondence between classes of circuit elements and sets of masks is based at least on the following non-obvious insight: circuit elements that are manufactured by the same set of masks are expected to have similar parameter variations. In other words, if the same set of masks are used to manufacture a set of transistors, then a parameter (e.g., the voltage threshold) of each transistor in the set of transistors is expected to vary by the same amount. Accordingly, embodiments described herein may (1) assign variation amounts to classes of circuit elements, where each class of circuit elements may correspond to a set of masks, and (2) modify a parameter value of a circuit element by a variation amount that is assigned to a class of circuit elements to which the circuit element belongs.

The process illustrated in FIG. 1 may generally be used to accurately analyze any type of mistracking for any type of circuit element. Types of mistracking include, but are not limited to, transistor threshold voltage mistracking, transistor doping mistracking, transistor channel length mistracking, metal layer resistivity mistracking, metal layer track width mistracking, and metal layer thickness mistracking. Types of circuit elements include, but are not limited to, transistors and metal interconnects.

Figure 2:
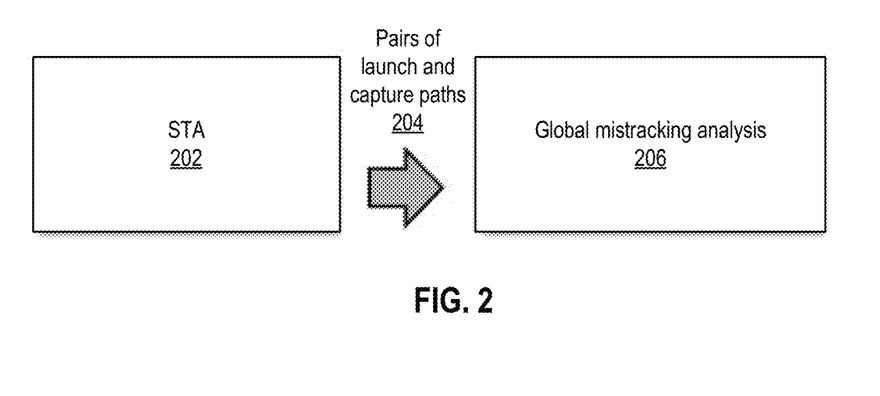
FIG. 2 illustrates a process for analyzing timing paths in accordance with some embodiments described herein.

FIG. 2 illustrates a process for analyzing timing paths in accordance with some embodiments described herein. In some embodiments described herein, static timing analysis (at 202) may be performed on an IC design to identify pairs of launch and capture paths 204 that have critical timing slacks. Next, global mistracking analysis (e.g., the process illustrated in FIG. 1) may be performed for each pair of launch and capture path (at 206).

Figure 3:
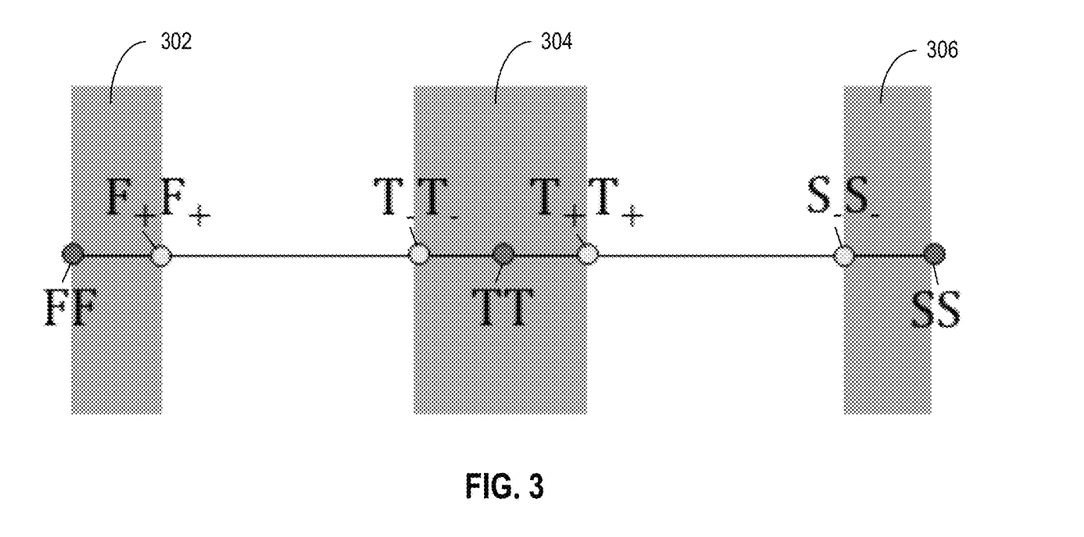
FIG. 3 illustrates corner-based timing signoff and region-based timing signoff in accordance with some embodiments described herein.

FIG. 3 illustrates corner-based timing signoff and region-based timing signoff in accordance with some embodiments described herein. Timing signoff may be performed at a few corners, e.g., at the fast-fast (FF) corner, typical-typical (TT) corner, and the slow-slow (SS) corner. The TT corner corresponds to semiconductor manufacturing conditions that cause n-type metal-oxide-semiconductor (NMOS) transistors and p-type metal-oxide-semiconductor (PMOS) transistors to switch at a typical speed. The first "T" in TT corresponds to the switching speed of NMOS transistors and the second "T" in TT corresponds to the switching speed of PMOS transistors. Likewise, the FF corner corresponds to faster-than-typical switching speeds and the SS corner corresponds to slower-than-typical switching speeds. A "+" or a "−" subscript refers to a variation with respect to the corner value. Thus, "T+" refers to a variation in the switching speed with respect to the typical switching speed, and "F+" refers to a variation in the switching speed with respect to the fast switching speed.

In some STA approaches, only the FF, TT, and SS corners may be analyzed during signoff. In some embodiments described herein, the parameter variations corresponding to shaded regions of the FF corner 302, the TT corner 304, and the SS corner 306 may be analyzed during signoff. Thus, embodiments described herein may improve signoff safety by covering regions of parameter variation instead of covering only a set of corners. Embodiments described herein are physically realistic and more accurate than the margin-based signoff approaches.

Variation Models

Figure 4:
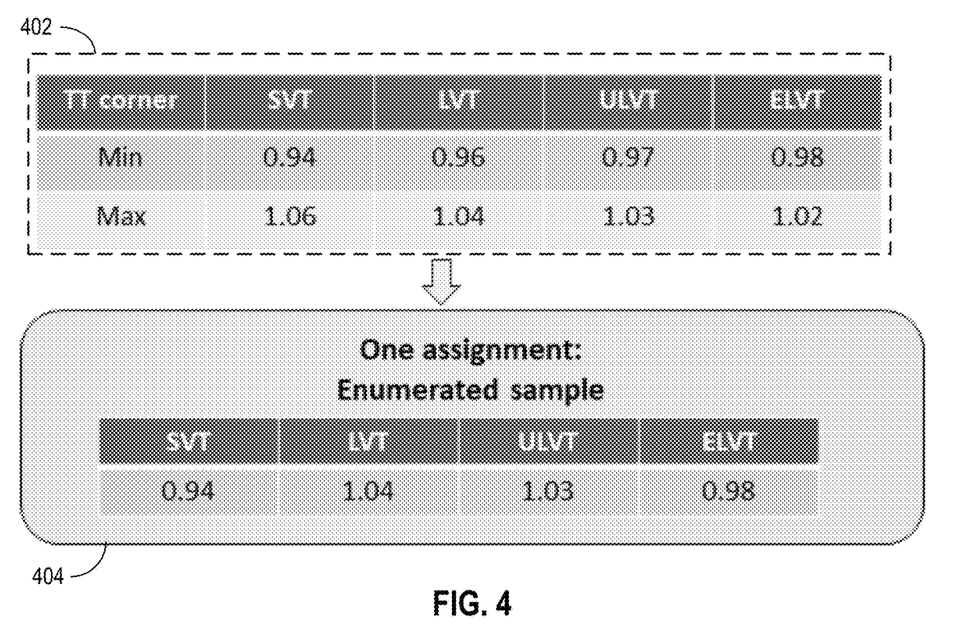
FIG. 4 illustrates a corner-based model in accordance with some embodiments described herein.

Variation models include a corner-based model and a statistical model. FIG. 4 illustrates a corner-based model in accordance with some embodiments described herein. A corner-based model can be obtained by skewing transistor parameters so that the impact on timing is maximized or minimized. For example, the threshold voltage, doping, and/or channel length of a transistor may be varied to obtain three switching speed corners, namely, a slow corner, a typical corner, and a fast corner. The term "switching speed" refers to the time it takes a transistor to switch between an off-state and an on-state, where a higher switching speed corresponds to a lower amount of time required to switch between the two states.

Corner-based model 402 models the timing impact by using minimum/maximum timing derates. For example, for the class of SVT transistors, the minimum switching delay at the TT corner is represented by the derating factor 0.94, and the maximum switching delay is represented by the derating factor 1.06. Likewise, corner-based model 402 defines the minimum and maximum derates for other classes of transistors.

Each class of transistors in corner-based model 402 has two timing derates at the TT corner. Thus, if there are N classes, then $2^N$ timing impact assignments may be generated at the TT corner by enumerating all combinations of timing derates of the N classes. In corner-based model 402, N=4, and a total of 16 assignments may be generated, where each assignment includes four timing impacts, one for each class. For example, assignment 404 may be generated based on corner-based model 402, where each class of transistors has been assigned either the minimum or maximum timing derate value.

Figure 5:
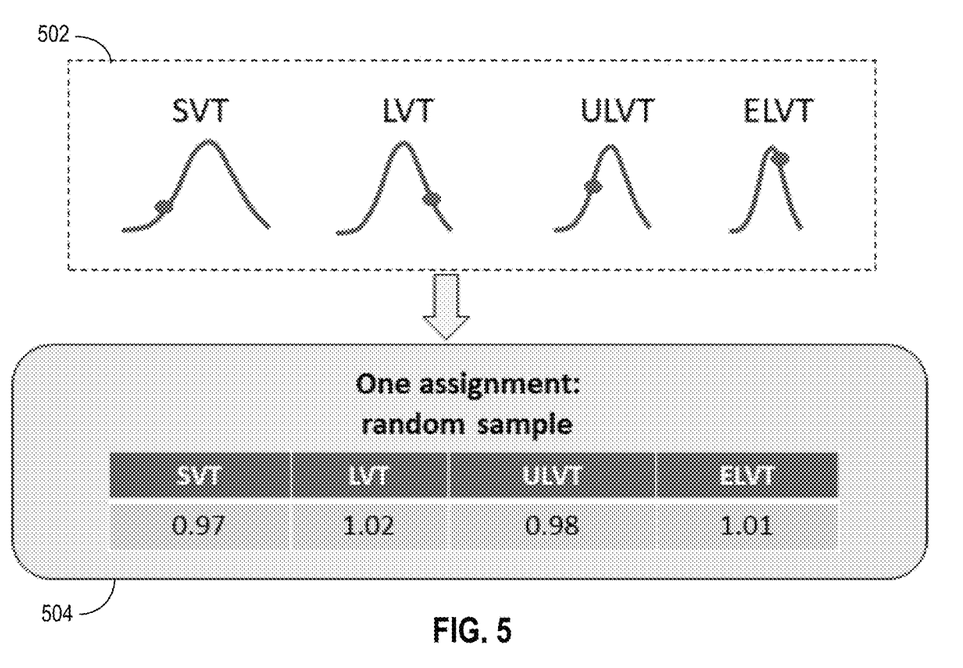
FIG. 5 illustrates a statistical model in accordance with some embodiments described herein.

FIG. 5 illustrates a statistical model in accordance with some embodiments described herein.

A statistical model provides a distribution of timing values produced when parameters of the transistor are varied. For example, a statistical model may model the switching speed of a transistor as a probability distribution (e.g., a normal distribution with a mean and a standard deviation), where a given switching speed is associated with a probability value with which the switching speed is expected to occur during manufacturing. Generally, statistical models are more accurate than corner-based models.

Statistical model 502 models the timing impact by using a distribution of timing derates. For example, a timing derate distribution is provided for the class of SVT transistors. Likewise, statistical model 402 may define timing derate distributions for other classes of transistors. A timing derating value may be randomly sampled from each distribution to generate one assignment. For example, assignment 504 may be generated based on statistical model 502, where each class of transistors has been assigned a timing derate value based on sampling the corresponding timing derate distribution.

Figure 6:
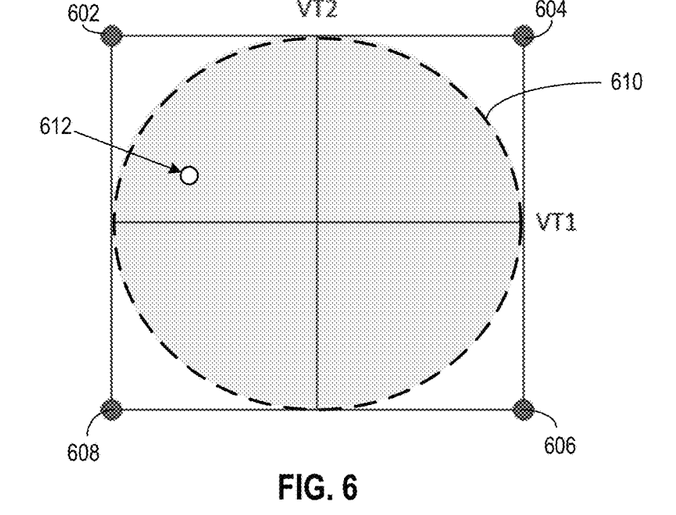
FIG. 6 illustrates coverage of corner-based models and coverage of statistical models in accordance with some embodiments described herein.

FIG. 6 illustrates coverage of corner-based models and coverage of statistical models in accordance with some embodiments described herein. Consider the situation with two voltage threshold classes: VT1 and VT2. A corner-based model may cover corners 602, 604, 606, and 608 by enumerating the minimum and maximum timing derate values. On the other hand, a statistical model may cover the region 610 in the parameter space. For example, assignment 612 may be obtained by sampling the distributions for VT1 and VT2. Region 610 may be covered by repeatedly sampling the distributions for VT1 and VT2.

Timing pessimism can be reduced by using statistical models instead of corner-based models. In the example shown in FIG. 6, the reduction in the timing pessimism may correspond to the area between region 610 and the square formed by corners 602, 604, 606, and 608.

MC-Based Global Mistracking Analysis

Figure 7:
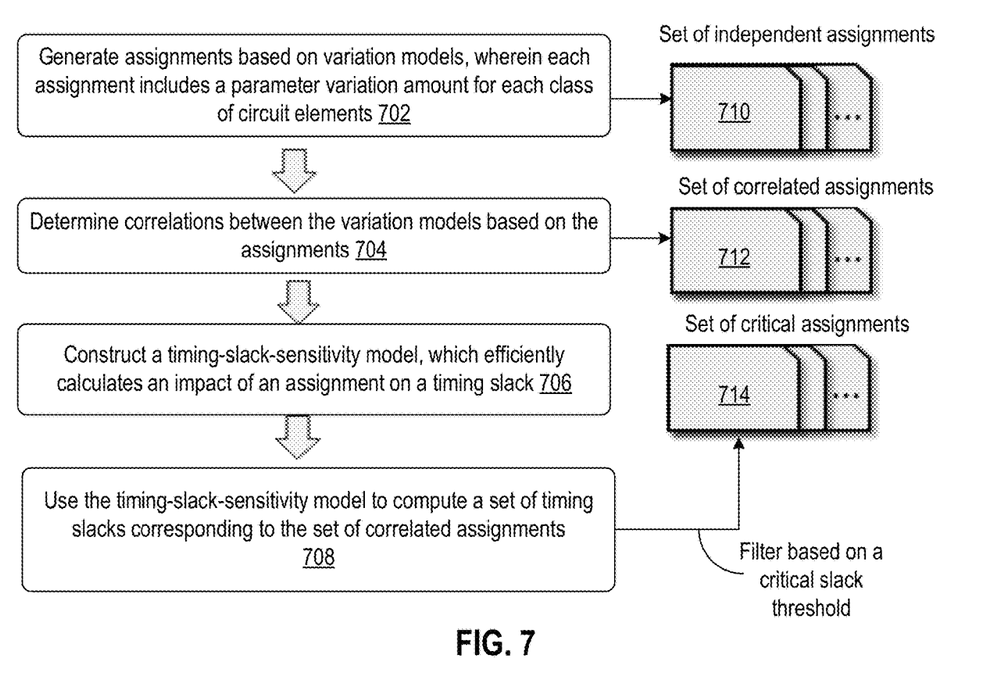
FIG. 7 illustrates a process for Monte-Carlo (MC)-based global mistracking analysis in accordance with some embodiments described herein.

FIG. 7 illustrates a process for MC-based global mistracking analysis in accordance with some embodiments described herein.

Assignments may be generated based on variation models, where each assignment includes a parameter variation amount for each class of circuit elements (at 702) to obtain a set of independent assignments 710. A parameter variation amount is a change in a parameter value. For example, if a parameter value is 1.0, and a variation amount is −0.1, then applying the parameter variation amount to the parameter value results in a modified parameter value of 0.9. Next, correlations between variation models may be determined based on the set of independent assignments (at 704) to obtain a set of correlated assignments 712.

Different classes of circuit elements may be partially correlated. The correlation may be represented by using a correlation matrix C as shown below:

$$C = \begin{bmatrix} \langle d_1, d_1 \rangle & \langle d_1, d_2 \rangle & ... & \langle d_1, d_p \rangle \\ \langle d_2, d_1 \rangle & \langle d_2, d_2 \rangle & ... & \langle d_2, d_p \rangle \\ & & ... & \\ \langle d_p, d_1 \rangle & \langle d_p, d_2 \rangle & ... & \langle d_p, d_p \rangle \end{bmatrix}$$

where, $d_i$ is the statistical model for the $i^{th}$ class of circuit elements, $\langle d_i, d_j \rangle$ is the correlation between the $d_i$ and $d_j$, and p is the number of classes of circuit elements.

Consider random sampled vectors $X_1, X_2, \ldots, X_p$, where each vector contains N elements, where N is the number of sampled assignments. The random vectors can be represented using a matrix as follows:

$$X = [X_1, X_2, \ldots, X_p],$$

and the relationship between correlation matrix C and X may be represented as follows:

$$C = X^T X = \begin{bmatrix} \langle X_1, X_1 \rangle & \langle X_1, X_2 \rangle & ... & \langle X_1, X_p \rangle \\ \langle X_2, X_1 \rangle & \langle X_2, X_2 \rangle & ... & \langle X_2, X_p \rangle \\ & & ... & \\ \langle X_p, X_1 \rangle & \langle X_p, X_2 \rangle & ... & \langle X_p, X_p \rangle \end{bmatrix}$$

where, $\langle X_i, X_j \rangle$ is correlation between $X_i$ and $X_j$.

Principle component analysis (PCA) may be performed on the matrix C to generate eigenvectors V and a diagonal matrix Σ. Specifically, in some embodiments, singular value decomposition (SVD) may be used for this purpose. Thus, matrix C may be represented as:

$$C = V \Sigma V^T$$

where,

V is a matrix composed of independent vector spaces of X

Σ is a diagonal matrix composed of square of singular values of X

The mapping matrix, $v \Sigma^{1/2}$, may be used to project the independent random variables to correlated random variables. Specifically, the mapping matrix may be used to map the independent random sampled assignment to a correlated sampled assignment.

Next, referring to FIG. 7, a timing-slack-sensitivity model may be constructed, which can be used to determine the timing slack for each assignment in a set of assignments (at 706).

It may be computationally expensive to perform an MC analysis when large number of assignments are used. Some embodiments construct a timing-slack-sensitivity model to perform an efficient MC analysis. Specifically, some embodiments described herein may perform sensitivity analysis to construct the timing-slack-sensitivity model. For example, a single parameter may be varied by a small amount and the impact the variation has on the timing slack may be computed. Next, the ratio between the change in the timing slack and the variation in the parameter may be stored as a sensitivity coefficient for the parameter.

For example, for a given set of voltage threshold classes, the following timing-slack-sensitivity model may be constructed:

$$S = S_0 + \sum_{i=1}^{\# \text{ of } VT \text{ classes}} a_i x_i$$

where,

S is path slack $S_0$ is the nominal path slack $x_i$ is decided by derating factor $a_i$ is the sensitivity coefficient In the above equation, the $x_i$ values are determined based on a given assignment. The $a_i$ values are constants that are determined when the timing-slack-sensitivity model is constructed. In the above model, the nominal path slack is the slack for a given timing path, e.g., a path that begins from a launch point, passes through a combinational cloud, and ends at a capture point. The timing path may also include any clock skews and delays of the launch and capture registers. The slack of a given timing path may change due to process variations. The sensitivity coefficients capture the effect that a particular variation has on the overall slack. A sensitivity coefficient of a given class of circuit elements may be computed by (1) modifying the timing of the given class of circuit elements by an incremental amount, (2) calculating a change in the nominal path slack $S_0$ when the timing of the given class of circuit elements is modified by the incremental amount, and (3) dividing the change in the nominal path slack $S_0$ by the incremental amount. The above timing-slack-sensitivity model has been shown for illustration purposes. In general, the timing-slack-sensitivity model may be constructed for any set of classes of circuit elements and may include linear and/or non-linear terms.

Next, referring to FIG. 7, the timing-slack-sensitivity model may be used to compute a set of timing slacks based on the set of correlated assignments (at 708). Specifically, a set of correlated assignments may be generated by sampling a set of independent random variables and applying the mapping matrix $V\Sigma^{1/2}$ to the random samples. Next, the timing-slack-sensitivity model may be used to efficiently determine a set of timing slacks corresponding to the set of correlated assignments. The timing slacks may be filtered based on a critical slack threshold of a timing constraint to obtain a set of critical assignments 714 that correspond to timing slacks that do not satisfy the timing constraint.

Figure 8:
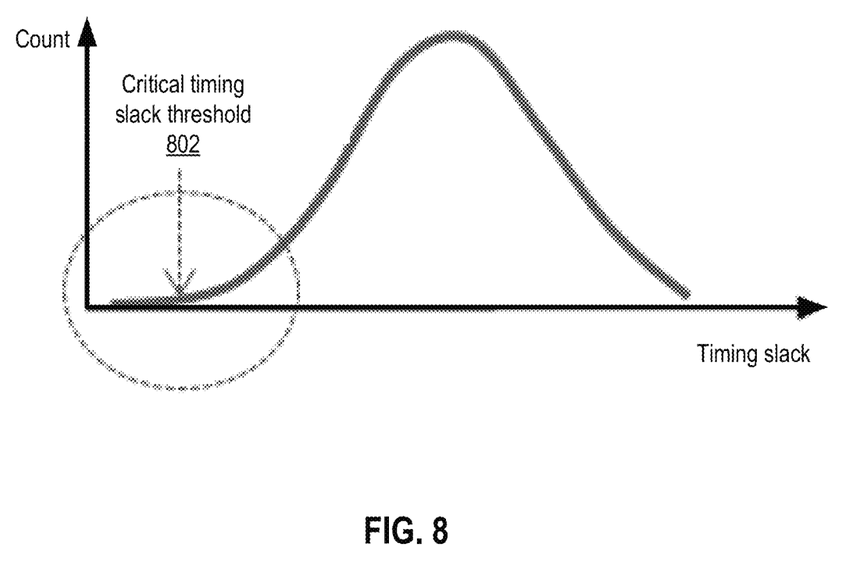
FIG. 8 illustrates a distribution of timing slacks in accordance with some embodiments described herein.

FIG. 8 illustrates a distribution of timing slacks in accordance with some embodiments described herein. A distribution of timing slacks may be created based on a set of timing slacks. Specifically, the X-axis may correspond to the timing slack and the Y-axis may correspond to the count of assignments that correspond to a given timing slack value. Next, assignments that correspond to a timing slack that is worse than a critical slack threshold 802 may be selected. In some embodiments, if the slack distribution is normal with a mean $\mu$ and standard deviation $\sigma$, then the critical timing slack threshold may be $(\mu - 3\sigma)$. The selected assignments may be referred to as critical assignments.

The process in FIG. 1 may then be used to determine timing slacks for the set of critical assignments. Specifically, for each critical assignment, the parameter value of a circuit element may be modified by a variation amount that is assigned to the class of circuit elements to which the circuit element belongs. Next, a timing slack may be computed for each pair of launch and capture paths. These timing slacks may then be used to signoff the IC design.

Figure 9:
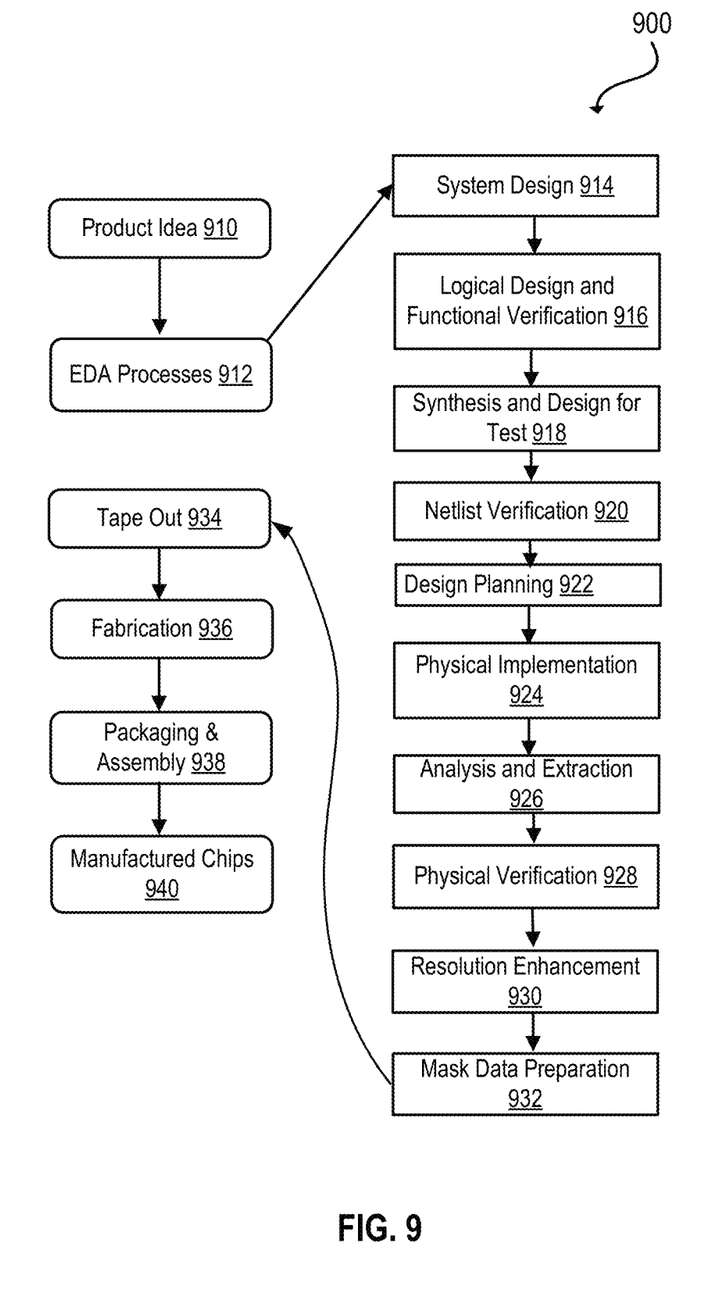
FIG. 9 illustrates an example set of processes used during the design, verification, and fabrication of an article of manufacture such as an integrated circuit to transform and verify design data and instructions that represent the integrated circuit.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' EDA can use one or more CAD tools. These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
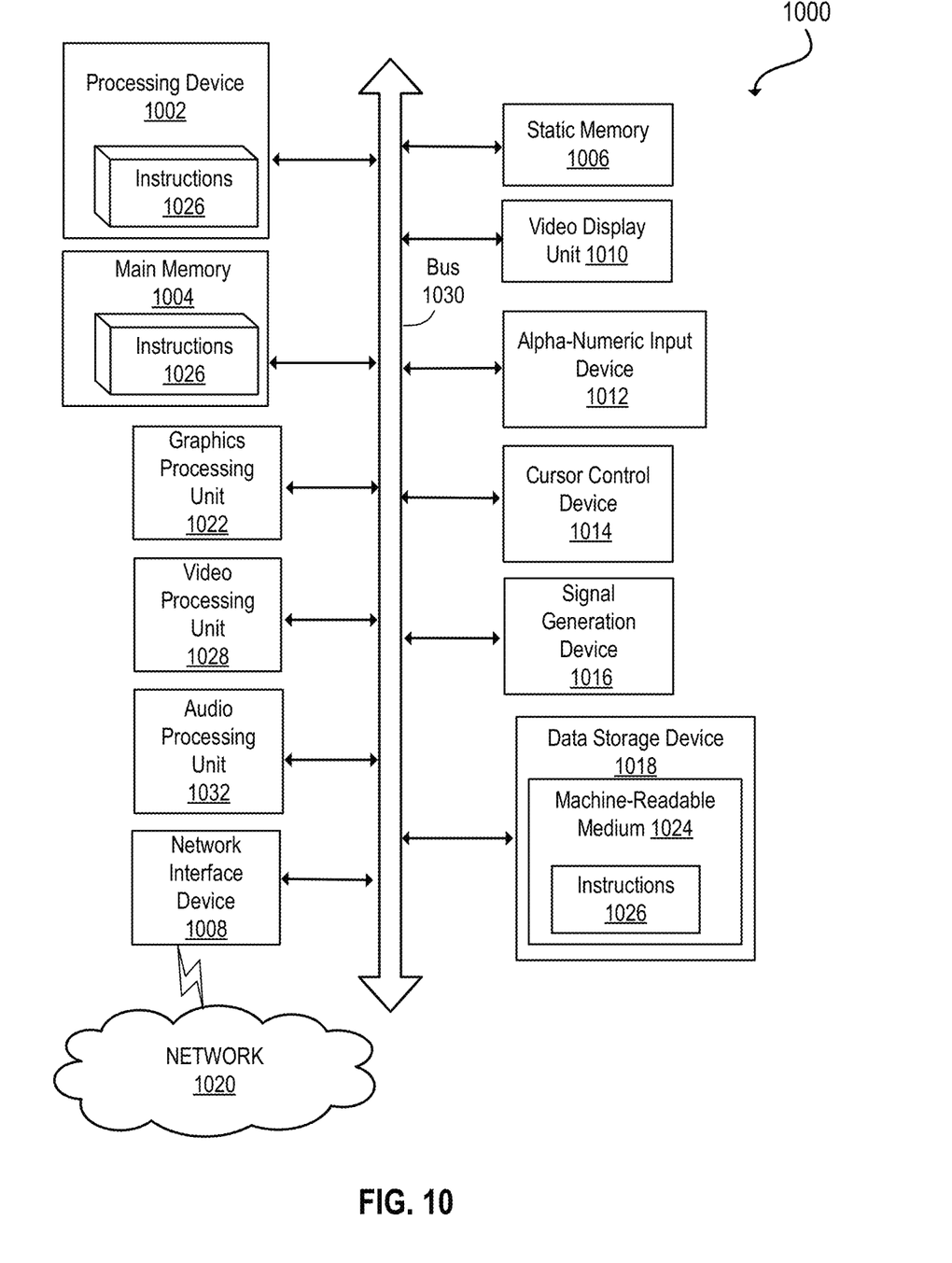
FIG. 10 illustrates an example machine of a computer system within which a set of instructions, for causing the machine to perform any one or more of the methodologies discussed herein, may be executed.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   assigning, by a processor, a respective variation amount to each class of circuit elements in a plurality of classes of circuit elements in a circuit design, wherein each respective variation amount is a random sample obtained by randomly sampling a variation model which models random parameter variations of a class of circuit elements in the circuit design;
   modifying a parameter value of each circuit element in a pair of launch path and capture path of a circuit design by a variation amount corresponding to a class of circuit elements to which the circuit element belongs, wherein a first circuit element in the launch path and a second circuit element in the capture path belong to a same class of circuit elements, and wherein the modifying comprises modifying a first parameter value of the first circuit element and a second parameter value of the second circuit element by a same variation amount; and
   computing, by the processor, a timing slack for the pair of launch path and capture path based on the modified parameter values.

2. The method of claim 1, wherein each class of circuit elements has a corresponding variation model which is used to assign the variation amount to the class of circuit elements.

3. The method of claim 2, wherein the corresponding variation model is a corner-based model.

4. The method of claim 2, wherein the corresponding variation model is a statistical model.

5. The method of claim 1, wherein each class of circuit elements corresponds to a set of masks, and wherein each circuit element in a given class of circuit elements is manufactured using the same set of masks.

6. The method of claim 1, wherein at least one class of circuit elements includes transistors that have one or more of a same threshold voltage, a same doping type, and a same channel length.

7. The method of claim 1, wherein at least one class of circuit elements includes interconnects on the same metal layer.

8. The method of claim 1, further comprising identifying the timing slack as a critical timing slack based on comparing the timing slack with a critical timing slack threshold.

9. A non-transitory storage medium storing instructions, which when executed by a processor, cause the processor to:
   assign a respective variation amount to each class of circuit elements in a plurality of classes of circuit elements in a circuit design, wherein each respective variation amount is a random sample obtained by randomly sampling a variation model which models random parameter variations of a class of circuit elements in the circuit design;
   modify a parameter value of each circuit element in a pair of launch path and capture path of a circuit design by a variation amount corresponding to a class of circuit elements to which the circuit element belongs, wherein a first circuit element in the launch path and a second circuit element in the capture path belong to a same class of circuit elements, and wherein the modifying comprises modifying a first parameter value of the first circuit element and a second parameter value of the second circuit element by a same variation amount; and
   compute a timing slack for the pair of launch path and capture path based on the modified parameter values.

10. The non-transitory storage medium of claim 9, wherein each class of circuit elements has a corresponding variation model which is used to assign the variation amount to the class of circuit elements.

11. The non-transitory storage medium of claim 10, wherein the corresponding variation model is a corner-based model.

12. The non-transitory storage medium of claim 10, wherein the corresponding variation model is a statistical model.

13. The non-transitory storage medium of claim 9, wherein each class of circuit elements corresponds to a set of masks, and wherein each circuit element in a given class of circuit elements is manufactured using the same set of masks.

14. The non-transitory storage medium of claim 9, wherein at least one class of circuit elements includes transistors that have one or more of a same threshold voltage, a same doping type, and a same channel length.

15. The non-transitory storage medium of claim 9, wherein at least one class of circuit elements includes interconnects on the same metal layer.

16. The non-transitory storage medium of claim 9, further comprising instructions, which when executed by the processor, cause the processor to identify the timing slack as a critical timing slack based on comparing the timing slack with a critical timing slack threshold.

17. A system comprising:
a memory storing instructions; and
a processor, coupled with the memory and to execute the instructions, the instructions when executed cause the processor to:
generate a set of assignments based on randomly sampling a set of variation models which models random parameter variations of circuit elements in the circuit design, wherein each assignment includes a parameter variation amount for each class of circuit element;
determine correlations between the variation models based on the set of assignments;
construct a timing-slack-sensitivity model to calculate a timing slack corresponding to a given set of assignments;
generate a set of samples for a set of independent random variables;
map the set of samples to a set of correlated assignments based on the correlations; and
use the timing-slack-sensitivity model to compute a set of timing slacks corresponding to the set of correlated assignments.

18. The system of claim 17, wherein each class of circuit elements corresponds to a set of masks, and wherein each circuit element in a given class of circuit elements is manufactured using the same set of masks.

19. The system of claim 17, wherein the set of variation models are corner-based models or statistical models.

20. The system of claim 17, wherein the memory further storing instructions, which when executed by the processor, cause the processor to compare the set of timing slacks with a critical timing slack threshold to identify critical timing slacks.

* * * * *